(12) United States Patent
Dursun et al.

(10) Patent No.: US 9,582,764 B2
(45) Date of Patent: Feb. 28, 2017

(54) REAL-TIME RISK PREDICTION DURING DRILLING OPERATIONS

(71) Applicant: Landmark Graphics Corporation, Houston, TX (US)

(72) Inventors: Serkan Dursun, Missouri City, TX (US); Tayfun Tuna, Houston, TX (US); Kaan Duman, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/429,072

(22) PCT Filed: Oct. 25, 2013

(86) PCT No.: PCT/US2013/066850
§ 371 (c)(1),
(2) Date: Mar. 18, 2015

(87) PCT Pub. No.: WO2015/060864
PCT Pub. Date: Apr. 30, 2015

(65) Prior Publication Data
US 2015/0356450 A1 Dec. 10, 2015

(51) Int. Cl.
| | | |
|---|---|---|
| G06G 7/48 | (2006.01) | |
| G06N 5/04 | (2006.01) | |
| G06N 99/00 | (2010.01) | |
| E21B 41/00 | (2006.01) | |
| G01V 11/00 | (2006.01) | |

(52) U.S. Cl.
CPC ............ *G06N 5/048* (2013.01); *E21B 41/00* (2013.01); *G06N 99/005* (2013.01); *G01V 11/00* (2013.01)

(58) Field of Classification Search
CPC ...................................................... G01V 11/00
USPC ............................................................ 703/10
See application file for complete search history.

(56) References Cited

U.S. PATENT DOCUMENTS

| | | | |
|---|---|---|---|
| 6,820,702 B2 * | 11/2004 | Niedermayr | E21B 21/08 175/24 |
| 2002/0103630 A1 * | 8/2002 | Aldred | E21B 44/00 703/10 |
| 2009/0119076 A1 | 5/2009 | Madatov et al. | |
| 2009/0225630 A1 * | 9/2009 | Zheng | G01V 1/42 367/81 |
| 2010/0155142 A1 | 6/2010 | Thambynayagam et al. | |
| 2011/0077918 A1 | 3/2011 | Mutlu et al. | |
| 2011/0106514 A1 | 5/2011 | Omeragic et al. | |
| 2011/0161133 A1 | 6/2011 | Staveley et al. | |
| 2011/0203845 A1 | 8/2011 | Jamison et al. | |

OTHER PUBLICATIONS

PCT /US2013/066856; search report; 3 pp; Jul. 10, 2014.*
(Continued)

*Primary Examiner* — Hugh Jones
(74) *Attorney, Agent, or Firm* — Polsinelli PC

(57) ABSTRACT

Systems and methods for real-time risk prediction during drilling operations using real-time data from an uncompleted well, a trained coarse layer model and a trained fine layer model for each respective layer of the trained coarse layer model. In addition to using the systems and methods for real-time risk prediction, the systems and methods may also be used to monitor other uncompleted wells and to perform a statistical analysis of the duration of each risk level for the monitored well.

17 Claims, 7 Drawing Sheets

(56) References Cited

OTHER PUBLICATIONS

Lian: A Study on Drilling Risk Real Time Recognition Technology Based on Fuzzy Reasoning: SPE 131886; 9 pages; 2010.*
Oilfield_Review_1999; 68 pages.*
Gundersen et al.: A Real-Time Decision Support System for High Cost Oil-Well Drilling Operations; Proceedings of the Twenty-Fourth Innovative Appications of Artificial Intelligence Conference; Jul. 2012; pp. 2209-2216.*
Murillo: SPE 120128: Pipe Sticking Prediction and Avoidance Using Adaptive Fuzzy Logic & Neural Network Modeling; 2009; 10pp.*
Commissioner; International Search Report and the Written Opinion of the International Searching Authority; PCT/US13/66850; Jul. 9, 2014; 12 pgs.; ISA/KR.
Li, Ying; First Examination Report; dated May 6, 2016; 3 pages; Patent Application No. 2013403352; Australian Intellectual Property Office; Australia.
Murillo, A et al. Pipe Sticking Prediction and Avoidance Using Adaptive Fuzzy Logic and Neural Network Modeling, 2009 SPE Production arid Operations Symposium, dated Apr. 4, 2009; 15 pages; SPE 120128; Oklahoma City, Oklahoma.
Rice, F.B.; Response to First Examination Report; dated May 30, 2016; 3 pages; Patent Application No. 2013403352; The Commissioner of Patents; Melbourne, Australia.
Bodnar, Kristina; First Examination Report; dated Apr. 26, 2016; 6 pages; Patent Application No. 2925268; Canadian Intellectual Property Office; Canada.
Li, Ying; Second Examination Report; dated Jun. 11, 2016; 3 pages; Patent Application No. 2013403352; Australian Intellectual Property Office; Australia.

* cited by examiner

US 9,582,764 B2

REAL-TIME RISK PREDICTION DURING DRILLING OPERATIONS

CROSS-REFERENCE TO RELATED APPLICATIONS

Not applicable.

STATEMENT REGARDING FEDERALLY SPONSORED RESEARCH

Not applicable.

FIELD OF THE DISCLOSURE

The present disclosure generally relates to systems and methods for real-time risk prediction during drilling operations. More particularly, the present disclosure relates to real-time risk prediction during drilling operations using real-time data from an uncompleted well, a trained coarse layer model and a trained fine layer model for each respective layer of the trained coarse layer model.

BACKGROUND

Conventional techniques for risk prediction during oil and gas drilling operations typically only consider a single model or a single approach to risk prediction. One disadvantage of such techniques includes losing precision in time-based prediction results due to training with large data sets. In addition, such techniques train their models by partitioning the historical data into three different time segments: i) when all drilling conditions are normal; ii) when risk realization is imminent; and iii) when the risk is actually realized such as, for example, stuck pipe. In most cases, the historical data for time segment (iii) reveals drastic changes compared to the other time segments. The historical data that comes from time segment (iii) thus, overwhelms the historical data for the other two time segments, which decreases the accuracy of predicting when risk realization is imminent in time segment (ii). Some conventional techniques also may only use a historical data from a single well for training, which may not be enough data to accurately describe the attributes of existing wells or new wells with the same geography.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
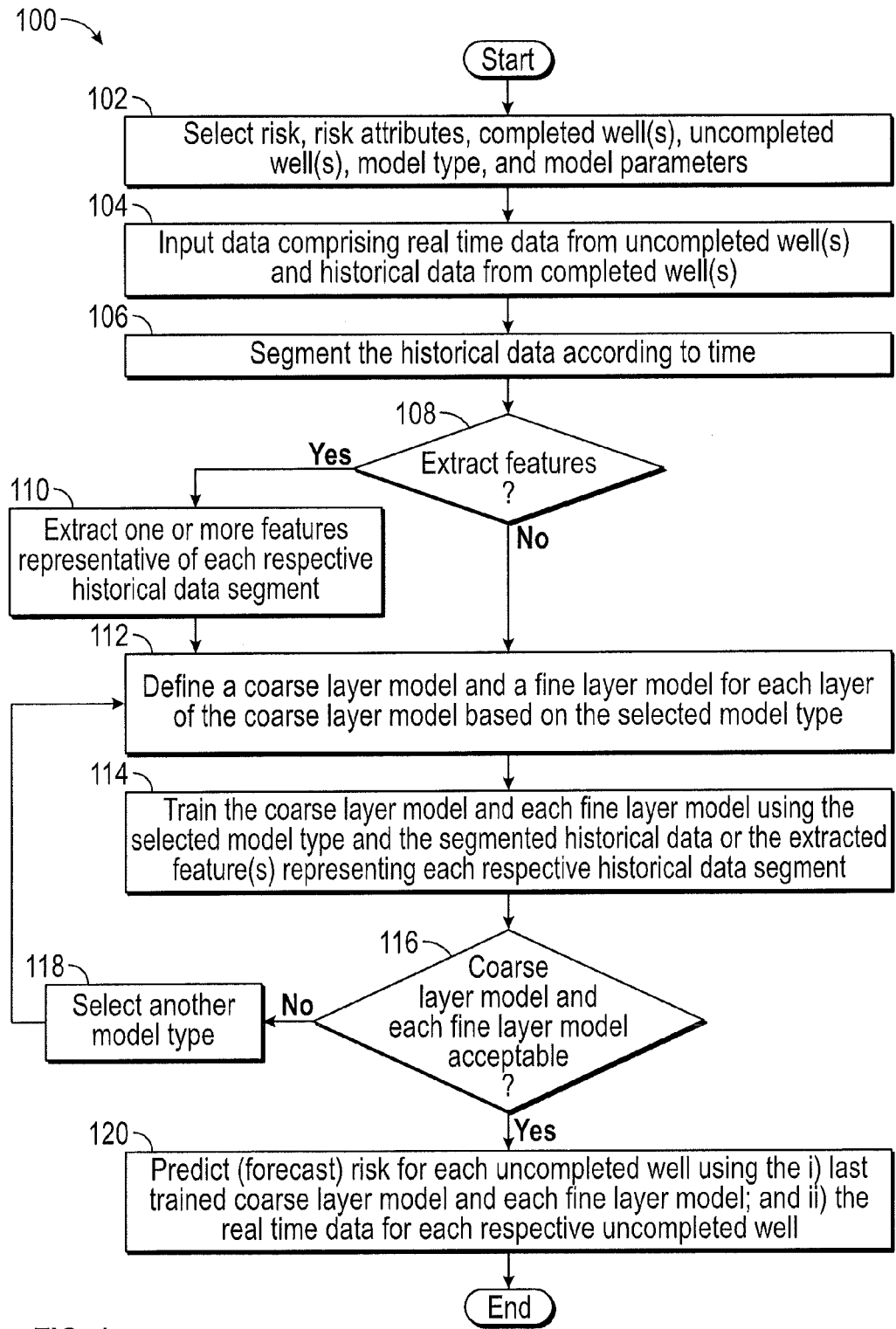
FIG. 1 is a flow diagram illustrating one embodiment of a method for implementing the present disclosure.

The present disclosure therefore, overcomes one or more deficiencies in the prior art by providing systems and methods for real-time risk prediction during drilling operations using real-time data from an uncompleted well, a trained coarse layer model and a trained fine layer model for each respective layer of the trained coarse layer model.

SUMMARY OF THE INVENTION

In one embodiment, the present disclosure includes a method for predicting a risk during drilling operations of a well, which comprises: i) defining a course layer model and a fine layer model for each layer of the coarse layer model based on a model type for the well comprising at least one from fuzzy mapping and static mapping; ii) training the coarse layer model and each fine layer model using a computer processor, the model type and at least one of segmented historical data and one or more extracted features representing each respective historical data segment; iii) repeating steps a)-b) with another model type until the coarse layer model and each fine layer model are acceptable; iv) predicting the predetermined risk for the well using an acceptable coarse layer model, each acceptable fine layer model and real-time data for the well received during drilling operations; and v) adjusting at least one of the drilling operations based on the predetermined risk predicted for the well.

In another embodiment, the present disclosure includes a non-transitory computer-readable medium comprising computer executable instructions for predicting a risk during drilling operations of a well, which comprises: i) defining a coarse layer model and a fine layer model for each layer of the coarse layer model based on a model type for the well comprising at least one from fuzzy mapping and static mapping; ii) training the coarse layer model and each fine layer model using the model type and at least one of segmented historical data and one or more extracted features representing each respective historical data segment; iii) repeating steps a)-b) with another model type until the coarse layer model and each fine layer model are acceptable; iv) predicting the predetermined risk for the well using an acceptable coarse layer model, each acceptable fine layer model and real-time data for the well received during drilling operations; and v) adjusting at least one of the drilling operations based on the predetermined risk predicted for the well.

In yet another embodiment, the present disclosure includes a non-transitory computer-readable medium comprising computer executable instructions for predicting a risk during drilling operations of a well, which comprises: i) defining a coarse layer model and a fine layer model for each layer of the coarse layer model based on a model type for the well comprising at least one from fuzzy mapping and static mapping; ii) training the coarse layer model and each fine layer model using a computer processor, the model type and at least one of segmented historical data and one or more extracted features representing each respective historical data segment; iii) repeating steps a)-b) with another model type until the coarse layer model and each fine layer model are acceptable; iv) predicting the predetermined risk for the well using an acceptable coarse layer model each acceptable fine layer model and real-time data for the well received during drilling operations; and v) adjusting at least one of the drilling operations based on the predetermined risk predicted for the well.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Referring now to FIG. 1, a flow diagram of one embodiment of a method 100 for implementing the present disclosure is illustrated. The method 100 presents a dual model approach for real-time risk prediction during drilling operations using real-time data from an uncompleted well, a trained coarse layer model and a trained fine layer model for each respective layer of the trained coarse layer model.

Figure 7:
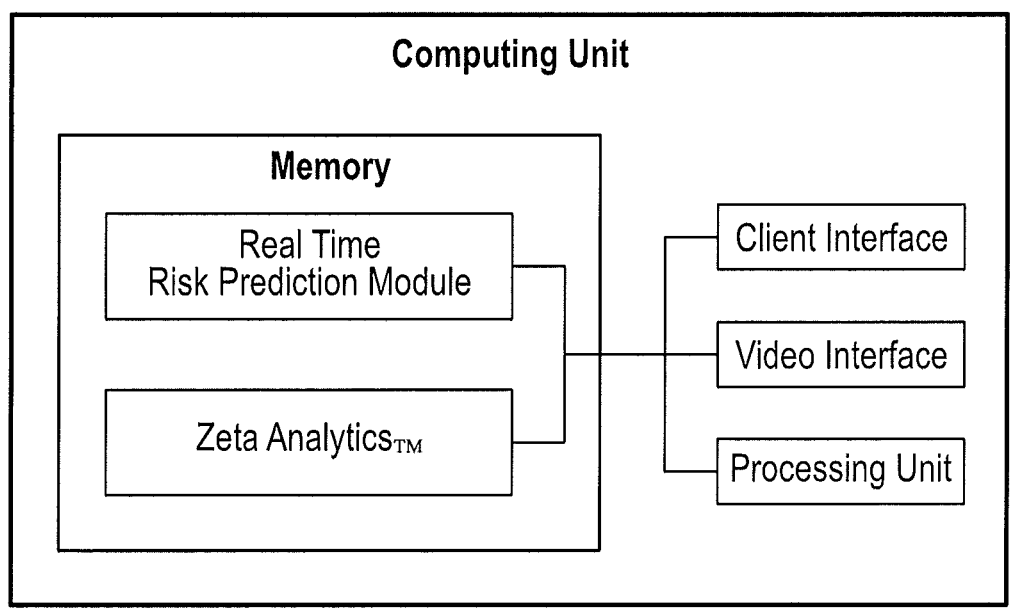
FIG. 7 is a block diagram illustrating one embodiment of a computer system for implementing the present disclosure.

In step 102, a risk, one or more risk attributes, one or more completed wells, one or more uncompleted wells, a model type, and model parameters are manually selected using the client interface and/or the video interface described further in reference to FIG. 7. Alternatively, the risk, the one or more risk attributes, the one or more completed wells, the one or more uncompleted wells, the model type, and/or the model parameters may be automatically selected. Risk, for example, may include any risk associated with drilling a well such as, for example, stuck pipe. Risk attributes may include any and all attributes associate with the risk such as, for example, hook load, weight on bit and motor rpm for stuck pipe. The model parameters are used to define a coarse layer model and a fine layer model for each layer of the coarse layer model as described further in reference to step 112. The model type is used to train the coarse layer model and each fine layer model as described further in reference to step 114. For exemplary purposes, the risk and risk attributes are selected for stuck pipe in the following description.

Figure 2:
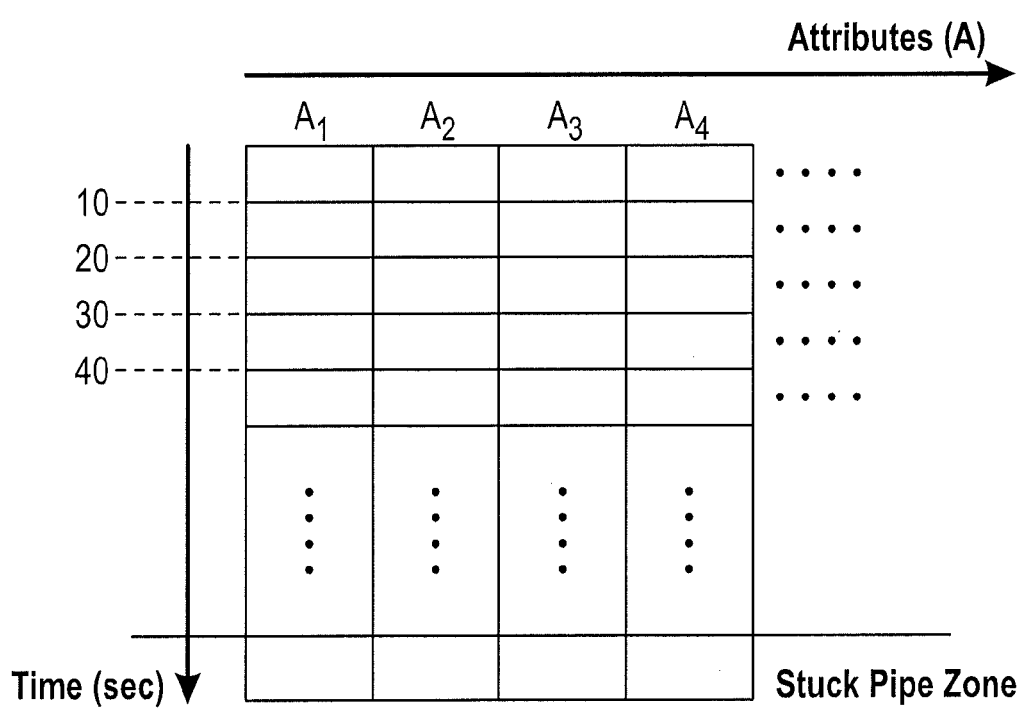
FIG. 2 is a display illustrating an exemplary format for multiple attributes of the historical data input in step 104 of FIG. 1.

In step 104, data comprising real-time data from the one or more uncompleted wells and historical data from the one or more completed wells is manually input using the client interface and/or the video interface described further in reference to FIG. 7. Alternatively, the real-time data and historical data may be input automatically. Real-time data and historical data may include: i) surface data logging such as rate of penetration (ROP), rotation per minute (RPM), weight on bit (WOB), hole depth and bit depth; ii) survey data such as inclination and azimuth; and iii) data measuring formation parameters such as resistivity, porosity, sonic velocity and gamma ray. Real-time data and historical data can be recorded in time-based and/or depth-based increments. Historical data also includes data related to the selected risk and risk attribute(s) from all available completed wells in the same geographic region. Each selected risk that is realized (e.g. a stuck pipe event) in the historical data is automatically or manually labeled with at least one of a time stamp and a depth stamp, and each selected risk attribute (e.g. weight on bit) in the historical data is automatically or manually labeled with at least one of a time stamp and a depth stamp as safe, potential risk or the realized risk. The risk attributes in the historical data are listed in columns, which form log curves. For each attribute, new historical data is formatted every ten (10) seconds as illustrated in FIG. 2. Alternatively, new historical data may be formatted in different time and/or depth increments depending on the available historical data.

Figure 3:
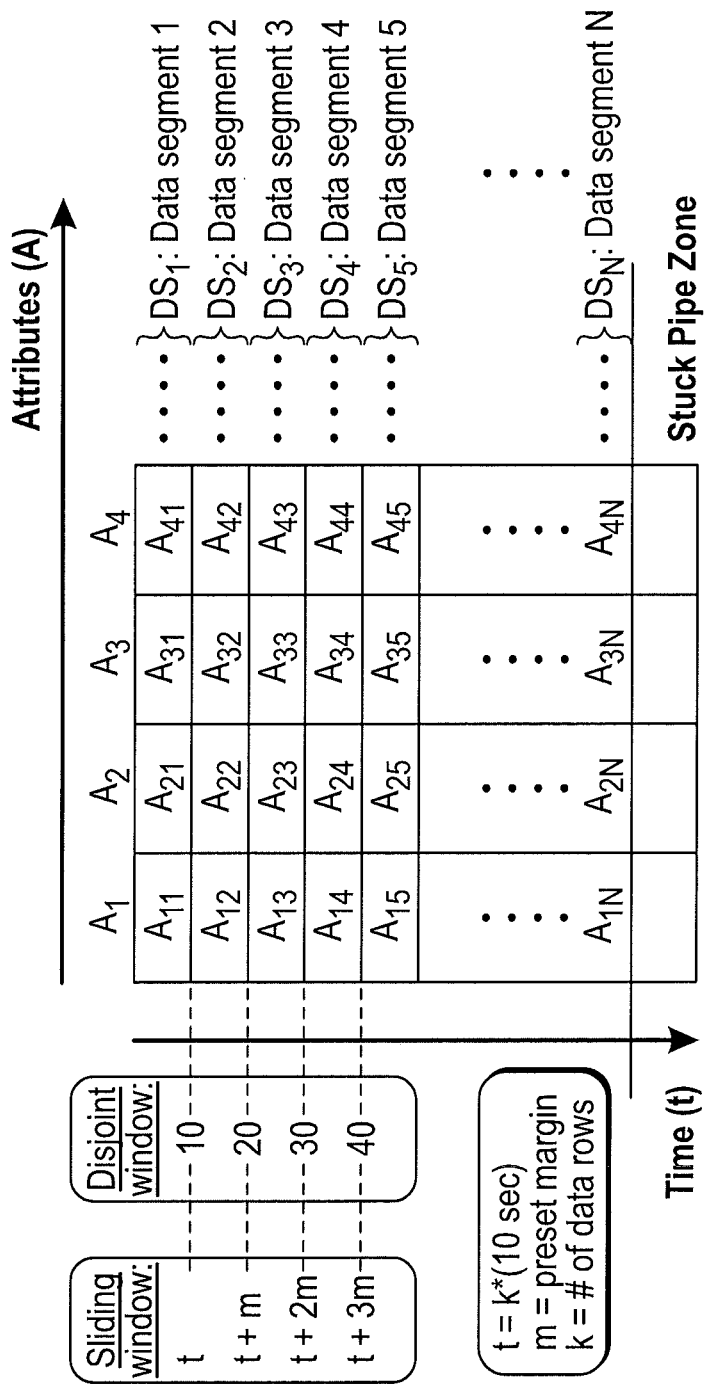
FIG. 3 is a display illustrating an exemplary format for the historical data segmented in step 106 of FIG. 1.

In step 106, the historical data is segmented according to time using techniques well known in the art. As illustrated in FIG. 3, the historical data may be segmented according to time and/or depth using a sliding window or a disjoint window for grouping the successive and consistent data segments.

In step 108, the method 100 determines whether to extract one or more features representative of each respective historical data segment based on input form the client interface and/or the video interface described further in reference to FIG. 7. If features should not be extracted, then the method 100 proceeds to step 112. If features should be extracted, then the method 100 proceeds to step 110. By extracting features representative of each respective historical data segment, the method 100 may be used to render more accurate real-time risk prediction results.

Figure 4:
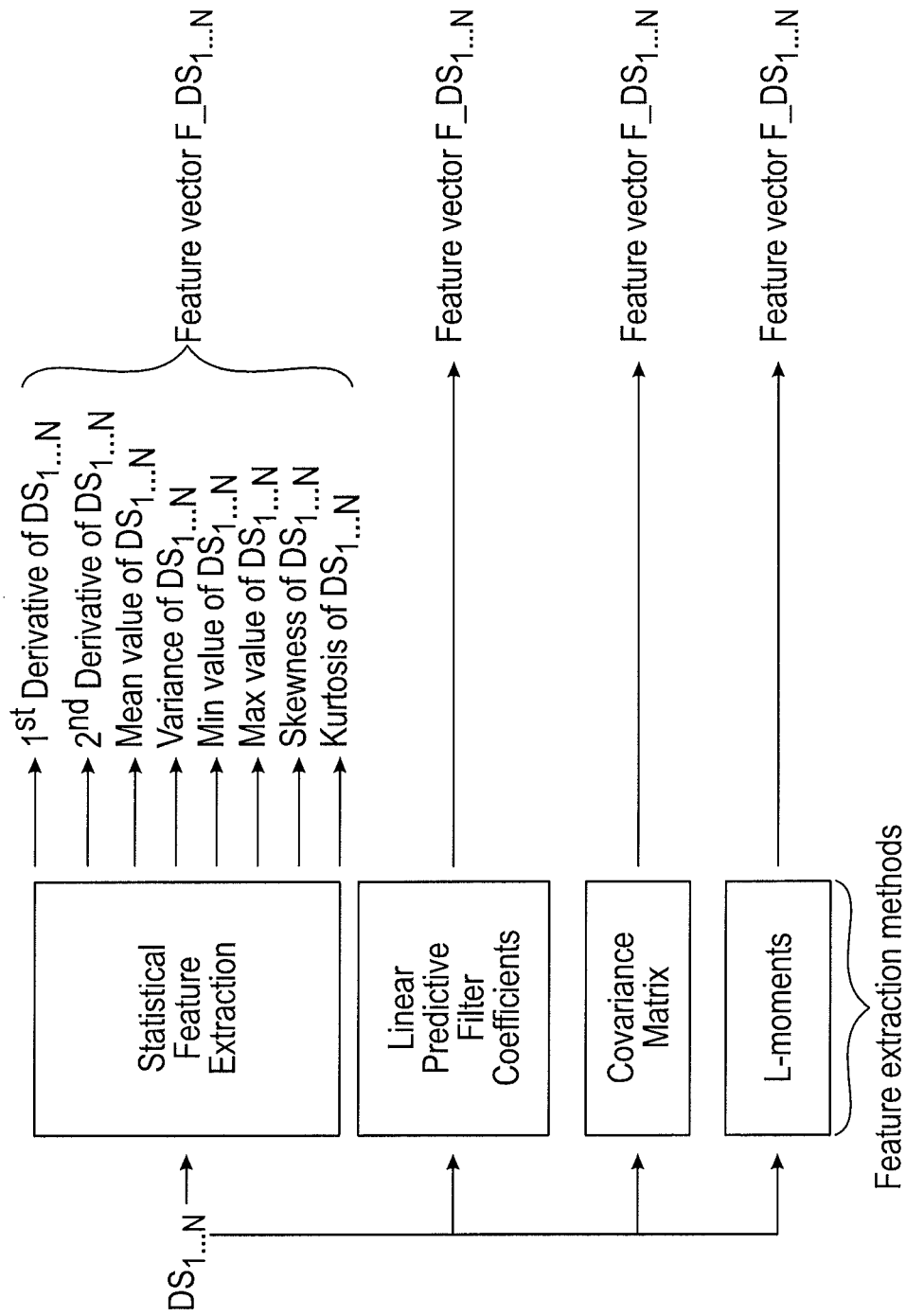
FIG. 4 is a display illustrating exemplary techniques for extracting one or more features representative of each respective historical data segment in step 110 of FIG. 1.

In step 110, one or more features representative of each respective historical data segment may be extracted using techniques well known in the art such as, for example, statistical feature extraction, linear predictive filter coefficients, a covariant matrix and/or L-moments. Although these techniques are exemplary, one or more may be used in this step. In FIG. 4, each exemplary feature extraction technique is illustrated. Each technique results in a respective feature vector ($F\_DS_{1 \ldots N}$). The feature vector ($F\_DS_{1 \ldots N}$) consists of N number of feature vectors. The statistical feature extraction technique results in basic order statistics of the segmented historical data such as, for example, the minimum value, maximum value, mean and variance of a segmented historical data. The statistical feature extraction technique thus, translates the basic order statistics of each data segment (DS) into a separate number N of feature vectors. The linear predictive filter coefficients technique results in linear filter coefficients and the L-moments technique results in L-moment values, each for a segmented historical data. The covariance matrix technique results may be achieved in the following manner. A typical historical data segment ($DS_i$) consists of a matrix of attributes:

$$DS_i = [A_{11} A_{21} \ldots A_{N1}] = \begin{bmatrix} a_{11} & \ldots & a_{N1} \\ \vdots & \ddots & \vdots \\ a_{1N} & \ldots & a_{NN} \end{bmatrix} \quad (1)$$

Before extracting the covariance feature(s) of $DS_i$, $DS_i$ is filtered to find its horizontal and vertical, first and second, derivatives in the form of a matrix:

$HD_1\_DS_i$: First Horizontal Derivative with respect to rows of $DS_i$ $VD_1\_DS_i$: First Vertical Derivative with respect to columns of $DS_i$ $HD_2\_DS_i$: Second Horizontal Derivative with respect to rows of $DS_i$ $VD_2\_DS_i$: Second Vertical Derivative with respect to columns of $DS_i$ The original and derivative values of all values listed in DS$_i$ are organized in the following matrix (M_DS$_i$):

$$M\_DS_i = \begin{bmatrix} a_{11} & HD1_{a_{11}} & VD1_{a_{11}} & HD2_{a_{11}} & VD2_{a_{11}} \\ \vdots & & \ddots & & \vdots \\ a_{NN} & HD1_{a_{NN}} & VD1_{a_{NN}} & HD2_{a_{NN}} & VD2_{a_{NN}} \end{bmatrix} \quad (2)$$

The first row of the matrix M_DS$_i$ consists of the values in the first (upper-left) position of all five matrices (DS$_i$, HD$_1$_DS$_i$, VD$_1$_DS$_i$, HD$_2$_DS$_i$, VD$_2$_DS$_i$). A total of N$^2$×5 values are inserted in the matrix M_DS$_i$. The covariance matrix of matrix M_DS$_i$ is calculated using the following equation:

$$COV\_DS_i = E[(M\_DS_i - E[M\_DS_i])^T (M\_DS_i - E[M\_DS_i])] \quad (3)$$

where (E) is the expectation of a matrix. Because the matrix calculated using equation (3) is symmetric, the values in the upper or lower triangle of the matrix are only used as covariance features. This technique thus, reduces the N$^2$ sized data to start with to a total of 15 values in order to identify DS$_i$ as a feature vector.

Figure 5:
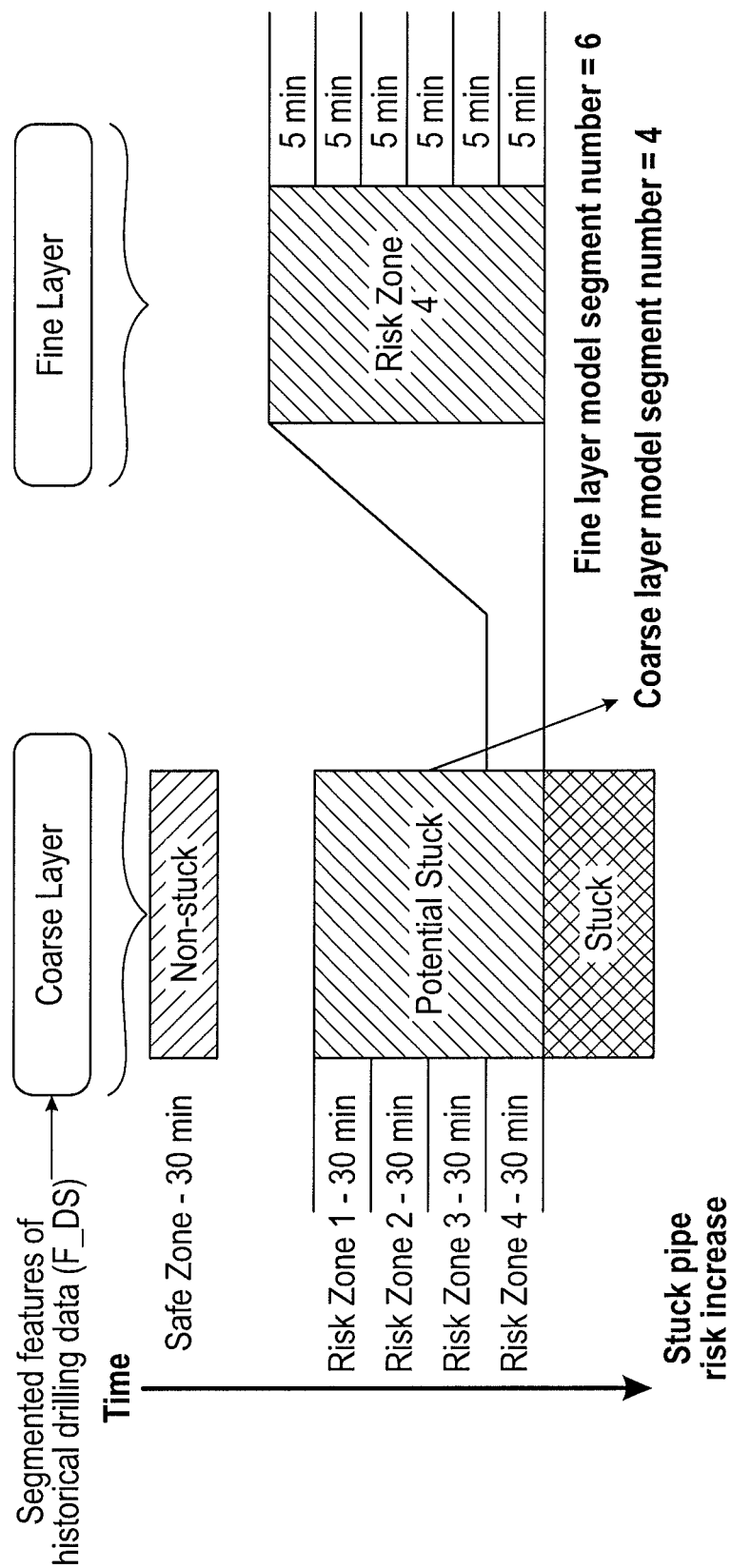
FIG. 5 is a display illustrating an exemplary coarse layer model and fine layer model defined in step 112 of FIG. 1.

In step 112, a coarse layer model and a fine layer model for each layer of the coarse layer model are defined based on the selected model type. The selected model type may be static mapping or fuzzy mapping. In static mapping, the duration and number of risk zones are predefined, however, in fuzzy mapping the duration and number of risk zones are not predefined as explained further herein. Fuzzy mapping includes a fuzzy inference system model and rules base defined by a domain expert, which are well known techniques that have not been used for defining a coarse layer model and a fine layer model for each layer of the coarse layer model. The fuzzy inference system and rules base automatically calculate, using the segmented historical data or the extracted feature(s) representing each respective historical data segment, the best number of i) layers for the coarse layer model representing different risk zones with the best incremental time (e.g. in minutes); and ii) layers for each fine layer model representing different classification levels with the best incremental time (e.g. in minutes) within a respective risk zone totaling the best incremental time of the respective risk zone. The best incremental time for each risk zone and classification level thus, may be different. In static mapping, the selected model parameters are used to define the coarse layer model and a fine layer model for each layer of the coarse layer model. The model parameters may include, for example, a forecasting horizon (e.g. in minutes), a coarse layer model segment number (i.e. layers of coarse layer model representing different risk zones with the same incremental time (e.g. in minutes) totaling the forecasting horizon), a fine layer model segment number (i.e. layers of each fine layer model representing different classification levels with the same incremental time (e.g. in minutes) within a respective risk zone totaling the incremental time of the respective risk zone) and a warning interval (e.g. in minutes). The forecasting horizon is the maximum amount of time the risk may be predicted in step 120 before the risk is realized (e.g. stuck pipe event) in the historical data. In FIG. 5, as a static mapping example, the coarse layer model and a fine layer model are illustrated for the risk of stuck pipe over a forecasting horizon of 120 minutes. The coarse layer model segment number is four (4), which divides the coarse layer model into 4 layers representing 4 different risk zones with the same incremental time (30 minutes) totaling the forecasting horizon (120 minutes) and a safe zone. The different risk zones represent different levels of potential stuck pipe depending on the forecasting horizon and the safe zone represents normal drilling conditions. The fine layer model segment number is six (6), which divides each fine layer model into 6 layers representing 6 different classification levels with the same incremental time (5 minutes) within a respective risk zone (e.g. risk zone 4) totaling the incremental time of the respective risk zone (30 minutes). Each classification level represents a different level of risk within the respective risk zone. Each layer of the coarse layer model representing a different risk zone therefore, includes a fine layer model with the same number of layers representing different classification levels. By using a coarse layer model and a fine layer model for each layer of the coarse layer model (e.g. a double layer approach), the number of layers may be reduced to enable machine-learning algorithms to work with higher accuracy and to forecast precisely how much time remains until a risk may be realized. The warning interval defines how often the results of step 120 are displayed and how much new historical data is used to display each result. If, for example, a 1 minute warning interval is selected, then 6 rows of new historical data are used (according to step 104 (1 row for every 10 seconds)) to display the result of step 120 every minute.

In step 114, the coarse layer model and each fine layer model are trained using the selected model type and at least one of the segmented historical data and the extracted feature(s) representing each respective historical data segment. The model type for the coarse layer model may be selected from static mapping or fuzzy mapping depending on which model type was used to define the coarse layer model and a fine layer model for each layer of the coarse layer model in step 112. In other words, the model type used in step 112 should also be used to train the coarse layer model and each fine layer model. Static mapping includes three different model types, which are well known in the art: fuzzy classification models, hidden Markov models and classification models. The model type for each fine layer model may also be selected from the same three different static mapping model types. Only one model type is selected for the coarse layer model and each fine layer model, which may be the same or different. Fuzzy mapping includes the fuzzy inference system model and rules base. The fuzzy inference system model includes four (4) components: fuzzification, inference, rules base and defuzzification, which are well known in the art. The rules base contains the rules defined by a drilling domain expert to identify indicators of certain drilling risks—such as stuck pipe. The inference unit performs the inference operation on the fuzzy rules defined in the rules base. Fuzzification transforms the crisp inputs into fuzzy linguistic values and defuzzification transforms the linguistic values into crisp values by using membership functions. The selected model type is used to train the coarse layer model and each fine layer model by mapping the at least one of the segmented historical data and the extracted feature(s) representing each respective historical data segment to i) the most appropriate layer of the coarse layer model representing a risk zone just prior to the realized risk or the safe zone; and ii) the most appropriate layer of the fine layer model representing a classification level within the respective risk zone of the coarse layer model. Because each selected risk that is realized (e.g. a stuck pipe event) in the segmented historical data and in the extracted feature(s) representing each respective historical data segment is labeled with at least one of a time stamp and a depth stamp, and because each selected risk attribute (e.g. weight on bit) in the segmented historical data and in the extracted feature(s) representing each respective historical data segment is labeled with at least one of a time stamp and a depth stamp as safe, potential risk or the realized risk, the segmented historical data and the extracted feature(s) representing each respective historical data segment may be easily mapped to i) the most appropriate layer of the coarse layer model representing a risk zone just prior to the realized risk or the safe zone; and ii) the most appropriate layer of the fine layer model representing a classification level within the respective risk zone of the coarse layer model as illustrated in FIG. 5.

In step 116, the method 100 determines if the coarse layer model and each fine layer model are acceptable based on the results of step 114. If the coarse layer model and each fine layer model are acceptable, then the method 100 proceeds to step 120. If the coarse layer model and each fine layer model are not acceptable, then the method 100 proceeds to step 118. The acceptability of the coarse layer model and each fine layer model depends on each model's accuracy of risk prediction using n-fold cross-validation, which is a technique well known in the art. If the accuracy result is below a predetermined value, then the coarse layer model or the respective fine layer model is unacceptable and fails to describe the segmented historical data or the extracted feature(s) representing each respective historical data segment mapped to their respective zones.

In step 118, another model type may be selected in the manner described in reference to step 102. Once another model type is selected, the method 100 reiterates through steps 112, 114 and 116 until the coarse layer model and each fine layer model are acceptable. In this manner, different model types may be selected and tested to determine an acceptable coarse layer model and each fine layer model.

In step 120, the risk for each uncompleted well is predicted (forecasted) using the last (i.e. acceptable) trained coarse layer model, each last (i.e. acceptable) trained fine layer model and the real-time data for each respective uncompleted well. The real-time data for each respective uncompleted well is compared to the last trained coarse layer model and each last trained fine layer model in order to classify the real-time data in either i) a safe zone (i.e. normal drilling conditions); or ii) a risk zone and a classification level within the respective risk zone. Because each risk zone and each classification level within the respective risk zone define the amount of time (e.g. in minutes) until the risk is realized (e.g. stuck pipe event), the classification of the real-time data in this manner as it is received during drilling operations can predict risk in real-time during the drilling operations of multiple conventional or unconventional uncompleted wells being monitored. The predicted risk results for each uncompleted well may be used to manage the drilling operations, in real-time, as necessary to reduce the level of risk for each respective uncompleted well.

Figure 6:
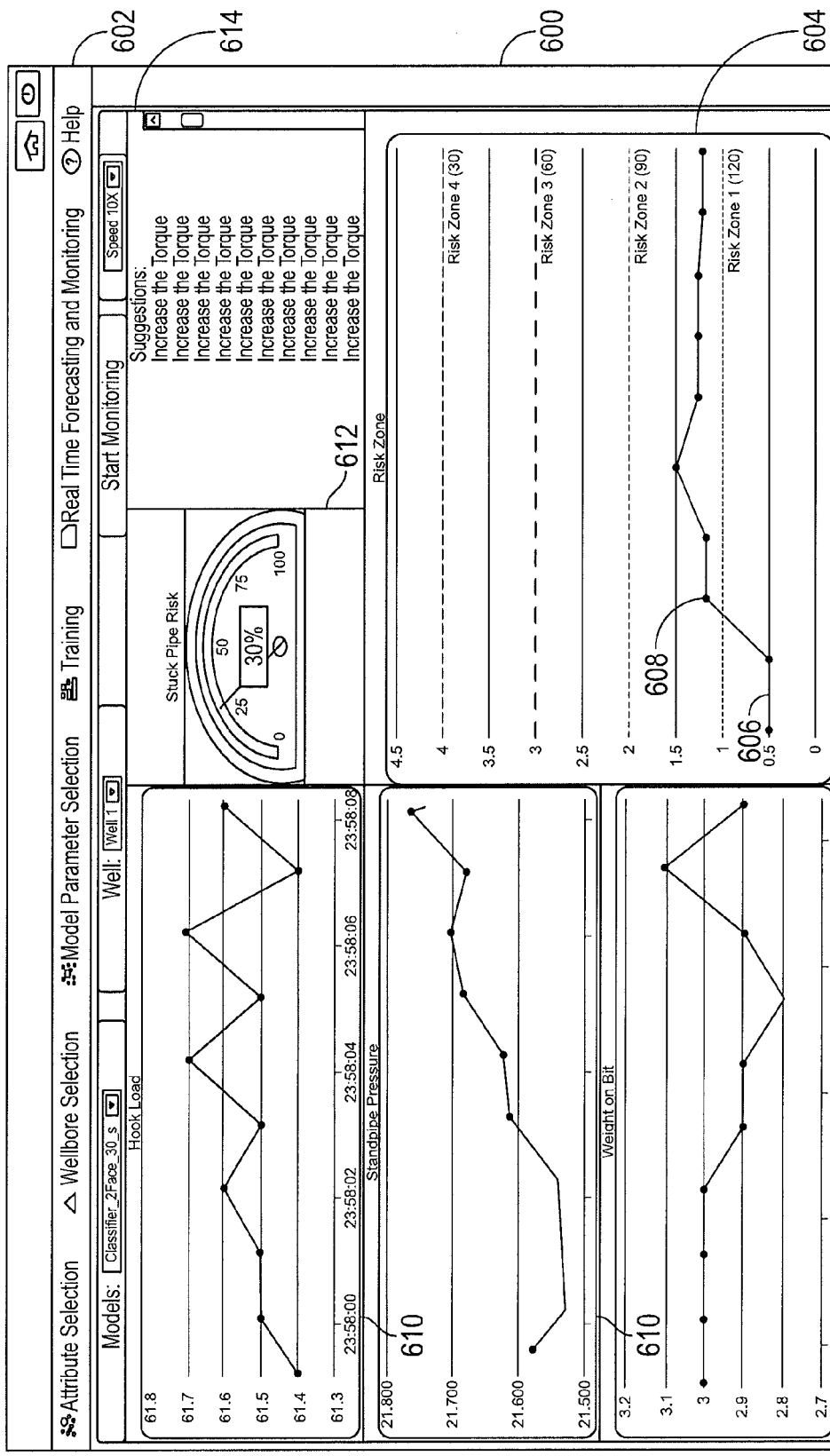
FIG. 6 is a display illustrating an exemplary graphical user interface for monitoring the risk predicted in step 120 of FIG. 1 and managing the drilling operations for each uncompleted well.

Referring now to FIG. 6, a display 600 of a graphical user interface for monitoring the predicted risk results from step 120 and managing the drilling operations for each uncompleted well is illustrated. The top bar 602 in the display 600 includes tabs for selecting the risk attributes associated with the selected risk, the uncompleted wellbore(s) to be monitored, the model parameters, and the model type for training the coarse layer model and each fine layer model. The selected risk attributes include hook load, standpipe pressure and weight on bit associated with the risk of stuck pipe. The selected uncompleted wellbore is Well 1. The selected model parameters include the forecasting horizon (120 minutes), the coarse layer model segment number (4), the fine layer model segment number (6) and the warning interval (1 minute). And, the selected model type is a classification model. As a result of selecting the real-time forecasting and monitoring tab in the top bar 602, the results of step 120 are displayed in a risk zone window 604. In this example, the coarse layer model is divided into 4 layers representing 4 different risk zones because the forecasting horizon (120 minutes) is divided into an equal number of risk zones by the coarse layer model segment number (4). Thus, each risk zone includes the same incremental time (30 minutes) totaling the forecasting horizon (120 minutes). Each fine layer model is divided into 6 layers representing 6 different classification levels with the same incremental time (5 minutes) within a respective risk zone totaling the incremental time of the respective risk zone (30 minutes). Each classification level represents a different level of risk within the respective risk zone. Risk zone 1 represents the lowest risk level at 90-120 minutes from the risk of a stuck pipe event and risk zone 4 represents the highest risk level at 0-30 minutes from the risk of a stuck pipe event. As the real-time data is received from Well 1 during drilling operations, it is classified in the manner described in reference to step 120 in FIG. 1 to predict the level of risk of stuck pipe for Well 1. The predicted level of risk of stuck pipe for Well 1 is thus, represented by a line 606 in the risk zone window 604. Line 606 is created in real-time and each data point 608 on line 606 represents the results of step 120. Each data point 608 on line 606 is separated from another data point 608 by the selected warning interval (1 minute). Although each classification level of each fine layer model is not visible in the risk zone window 604, each classification level represents a different level of risk within the respective risk zone and is used to classify the data points 608 within risk zone 1 and risk zone 2. In addition to the risk zone window 604, the display 600 includes risk attribute windows 610 for monitoring the selected risk attributes (e.g. hook load, standpipe pressure, weight on bit) and a risk percentage window 612 for monitoring the predicted risk of stuck pipe as a percentage.

As line 606 is formed and monitored in the risk zone window 604, various suggestions may appear in a drilling operations window 614. The suggestions relate to changes that may be made to the current drilling operations, which are based on the last trained coarse layer model and each last trained fine layer model, in order to lower the level of risk in real-time. The suggestions are predetermined by a domain expert according to the last trained coarse layer model and each last trained fine layer model. In this manner, a drilling operations suggestion may be predetermined for each classification level of risk and displayed in the drilling operations window 614 when a data point 608, representing the real-time data, is classified within a respective classification level. The drilling operations suggestion in the drilling operations window 614 suggests an increase in torque during drilling operations to reduce the level of risk from risk zone 2 to risk zone 1. If there is no display of line 606, then it is presumed that the drilling operations are in a safe zone.

In addition to using the results of step 120 for real-time risk prediction, the results may also be stored and used later as historical data: i) to monitor other uncompleted wells according to the method 100; and ii) to perform a statistical analysis of the duration of each risk level for the monitored well. In the latter use, the statistical analysis may include, for example: i) a probability distribution of the duration of a particular risk level; ii) a probability distribution of the total duration of consecutive risk levels; iii) a probability distribution of the duration of consecutive predicted events at the same risk level (e.g. risk zone 5); and iv) a probability distribution of the duration and sequence of risk levels predicting an event pattern. As an example, a statistical analysis of the exemplary probability distributions may be used to determine the wells with a loss of circulation problem while drilling. The analysis of one or more probability distributions may reveal that the loss of circulation primarily occurred in wells in which the duration of a particular risk level (e.g. level 3) followed a Gaussian distribution. As a result, there is a correlation between the loss of circulation and the duration of risk level 3 during drilling operations. Once this correlation is validated (e.g. experienced at multiple wells), it may be used for real-time analysis by calculating the probability distribution of the duration of the various risk levels during drilling operations. If the duration of a particular risk level (e.g. level 3) follows a Gaussian distribution, then a notification may be sent as an alert that there is an imminent loss of circulation. A statistical analysis of the exemplary probability distributions may also be used to determine: i) the wells with more invisible time or non-productive time while drilling (the duration of a particular risk level (e.g. level 4) follows a Log normal distribution); and ii) the wells with stuck pipe (the risk levels followed a pattern of short duration at risk level 4, then a long duration at risk level 3 then a stuck pipe event).

The method 100 in FIG. 1 and the graphical user interface in FIG. 6 therefore, enable drilling operators, engineers and managers to monitor certain risks, in real-time, during drilling operations of uncompleted wells and to make informed decisions regarding when and how to manage or modify the drilling operations to reduce the level of risk in advance. As such, the cost of drilling operations may be reduced and productivity increased. Compared to conventional risk prediction techniques, the method 100 considers only the historical data for the well during drilling conditions just prior to the time a particular risk is realized (i.e. during drilling conditions before the risk is realized but not drilling conditions during the realized risk). Because the historical data during the realized risk is not considered, the risk prediction accuracy is improved. And, because the historical data from all available completed wells in the same geographic region is used to train the models, the method 100 becomes more accurate in predicting risk while drilling a new well with the same geography.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. Zeta Analytics™, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 7, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-6. The memory therefore, includes a real-time risk prediction module, which may integrate functionality from the remaining application programs illustrated in FIG. 7. In particular, Zeta Analytics™ may be used as an interface application to provide the model types in step 102, to provide the historical data in step 104 and to display and monitor the results of step 120 using a graphical user interface. The real-time risk prediction module enables the performance of the rest of steps 102-120 described in reference to FIG. 1. Although Zeta Analytics™ may be used as interface application, other interface applications may be used, instead, or the real-time risk prediction module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for predicting a risk during drilling operations of a well, which comprises:
   a) defining a coarse layer model and a fine layer model for each layer of the coarse layer model based on a model type for the well comprising at least one from fuzzy mapping and static mapping;
   b) training the coarse layer model and each fine layer model using a computer processor, the model type and at least one of segmented historical data and one or more extracted features representing each respective historical data segment;
   c) repeating steps a)-b) with another model type until the coarse layer model and each fine layer model are acceptable;
   d) predicting the predetermined risk for the well using an acceptable coarse layer model, each acceptable fine layer model and real-time data for the well received during drilling operations; and
   e) adjusting at least one of the drilling operations based on the predetermined risk predicted for the well.

2. The method of claim 1, wherein the fuzzy mapping includes a fuzzy inference system model and a rules base, which calculate, using the at least one of the segmented historical data and the one or more extracted features representing each respective historical data segment, a best number of layers for the coarse layer model representing different risk zones with a best respective incremental time and a best number of layers for each fine layer model representing different classification levels with a best respective incremental time within a respective risk zone totaling the best incremental time of the respective risk zone.

3. The method of claim 1, wherein the static mapping uses multiple model parameters, which include a forecasting horizon, a coarse layer model segment number, a fine layer model segment number and a warning interval.

4. The method of claim 3, wherein the coarse layer model segment number represents a number of layers for the coarse layer model, which represent different risk zones with the same incremental time totaling the forecasting horizon and the fine layer model segment number represents a number of layers for each fine layer model, which represent different classification levels with the same incremental time within a respective risk zone totaling the incremental time of the respective risk zone.

5. The method of claim 1, wherein a realization of the predetermined risk is labeled with at least one of a time stamp and a depth stamp in the at least one of the segmented historical data and the one or more extracted features representing each respective historical data segment.

6. The method of claim 5, wherein one or more risk attributes are labeled with at least one of a time stamp and a depth stamp as safe, potential risk or the realized predetermined risk in the at least one of the segmented historical data and the one or more extracted features representing each respective historical data segment.

7. The method of claim 6, wherein the at least one of the segmented historical data and the one or more extracted features representing each respective historical data segment are mapped to a most appropriate layer of the coarse layer model representing a risk zone or a safe zone and a most appropriate layer of the fine layer model representing a classification level within the respective risk zone of the coarse layer model using the labeled realized predetermined risk and the one or more labeled risk attributes.

8. The method of claim 7, wherein predicting the predetermined risk for the well comprises: comparing to the real-time data for the well to the acceptable coarse layer model and each acceptable fine layer model, which classifies the real-time data in a safe zone, or a risk zone and a classification level within the respective risk zone; repeating step d) in claim 1 as the real-time data for the well is received during the drilling operations; and displaying the predicted predetermined risk for the well during the drilling operations at a predetermined warning interval.

9. A non-transitory computer-readable medium comprising computer executable instructions for predicting a risk during drilling operations of a well, the instructions being executable to implement:
   a) defining a coarse layer model and a fine layer model for each layer of the coarse layer model based on a model type for the well comprising at least one from fuzzy mapping and static mapping;

b) training the coarse layer model and each fine layer model using the model type and at least one of segmented historical data and one or more extracted features representing each respective historical data segment;

c) repeating steps a)-b) with another model type until the coarse layer model and each fine layer model are acceptable;

d) predicting the predetermined risk for the well using an acceptable coarse layer model, each acceptable fine layer model and real-time data for the well received during drilling operations; and e) adjusting at least one of the drilling operations based on the predetermined risk predicted for the well.

10. The computer-readable medium of claim 9, wherein the fuzzy mapping includes a fuzzy inference system model and a rules base, which calculate, using the at least one of the segmented historical data and the one or more extracted features representing each respective historical data segment, a best number of layers for the coarse layer model representing different risk zones with a best respective incremental time and a best number of layers for each fine layer model representing different classification levels with a best respective incremental time within a respective risk zone totaling the best incremental time of the respective risk zone.

11. The computer-readable medium of claim 9, wherein the static mapping uses multiple model parameters, which include a forecasting horizon, a coarse layer model segment number, a fine layer model segment number and a warning interval.

12. The computer-readable medium of claim 11, wherein the coarse layer model segment number represents a number of layers for the coarse layer model, which represent different risk zones with the same incremental time totaling the forecasting horizon and the fine layer model segment number represents a number of layers for each fine layer model, which represent different classification levels with the same incremental time within a respective risk zone totaling the incremental time of the respective risk zone.

13. The computer-readable medium of claim 9, wherein a realization of the predetermined risk is labeled with at least one of a time stamp and a depth stamp in the at least one of the segmented historical data and the one or more extracted features representing each respective historical data segment.

14. The computer-readable medium of claim 13, wherein one or more risk attributes are labeled with at least one of a time stamp and a depth stamp as safe, potential risk or the realized predetermined risk in the at least one of the segmented historical data and the one or more extracted features representing each respective historical data segment.

15. The computer-readable medium of claim 14, wherein the at least one of the segmented historical data and the one or more extracted features representing each respective historical data segment are mapped to a most appropriate layer of the coarse layer model representing a risk zone or a safe zone and a most appropriate layer of the fine layer model representing a classification level within the respective risk zone of the coarse layer model using the labeled realized predetermined risk and the one or more labeled risk attributes.

16. The computer-readable medium of claim 15, wherein predicting the predetermined risk for the well comprises: comparing to the real-time data for the well to the acceptable coarse layer model and each acceptable fine layer model, which classifies the real-time data in a safe zone, or a risk zone and a classification level within the respective risk zone; repeating step d) in claim 10 as the real-time data for the well is received during the drilling operations; and displaying the predicted predetermined risk for the well during the drilling operations at a predetermined warning interval.

17. A non-transitory computer-readable medium comprising computer executable instructions for predicting a risk during drilling operations of a well, the instructions being executable to implement:

defining a coarse layer model and a fine layer model for each layer of the coarse layer model based on a model type for the well comprising at least one from fuzzy mapping and static mapping;

training the coarse layer model and each fine layer model using the model type and at least one of segmented historical data and one or more extracted features representing each respective historical data segment;

predicting the predetermined risk for the well using the coarse layer model, each fine layer model and real-time data for the well received during drilling operations; and adjusting at least one of the drilling operations based on the predetermined risk predicted for the well.

* * * * *